(12) United States Patent
Siers

(10) Patent No.: US 10,272,984 B2
(45) Date of Patent: Apr. 30, 2019

(54) APPARATUSES AND METHODS FOR FLEXURALLY CONTROLLING ELONGATED STRUCTURES

(71) Applicant: The Boeing Company, Huntington Beach, CA (US)

(72) Inventor: Richard William Siers, Renton, WA (US)

(73) Assignee: The Boeing Company, Chicago, IL (US)

( * ) Notice: Subject to any disclaimer, the term of this patent is extended or adjusted under 35 U.S.C. 154(b) by 272 days.

(21) Appl. No.: 14/750,244

(22) Filed: Jun. 25, 2015

(65) Prior Publication Data

US 2016/0375977 A1 Dec. 29, 2016

(51) Int. Cl.
*B64C 1/06* (2006.01)
*B64C 3/18* (2006.01)
*B64C 3/38* (2006.01)

(52) U.S. Cl.
CPC ............. *B64C 1/06* (2013.01); *B64C 1/064* (2013.01); *B64C 1/065* (2013.01); *B64C 3/182* (2013.01); *B64C 3/185* (2013.01); *B64C 3/38* (2013.01)

(58) Field of Classification Search
CPC ........... B64C 1/16; B64C 1/065; B64C 1/064; B64C 3/48; B64C 3/52; B64C 9/02; B64C 9/16; B64C 9/18; B64C 9/28; C22F 1/006; F02K 1/06; F02K 1/10; F02K 1/15; F03G 7/065
See application file for complete search history.

(56) References Cited

U.S. PATENT DOCUMENTS

| | | | | |
|---|---|---|---|---|
| 1,567,531 A | * | 12/1925 | Magni | B64C 3/48 244/215 |
| 4,198,018 A | * | 4/1980 | Brault | B29D 99/0003 244/119 |
| 6,070,834 A | * | 6/2000 | Janker | B64C 3/48 244/213 |
| 7,216,831 B2 | | 5/2007 | Wood | |
| 7,287,358 B2 | | 10/2007 | Zambelli et al. | |
| 7,384,016 B2 | * | 6/2008 | Kota | B63B 1/285 244/123.1 |

(Continued)

FOREIGN PATENT DOCUMENTS

DE 196 53 851 A1 6/1998
DE 10 2004 045 65 A1 3/2006

(Continued)

*Primary Examiner* — Medhat Badawi
*Assistant Examiner* — Vincente Rodriguez
(74) *Attorney, Agent, or Firm* — MH2 Technology Law Group LLP

(57) ABSTRACT

A flexurally controlled system comprises an elongated structure, a tendon attached to the elongated structure, and an actuator operable to apply a tensile load to the tendon. The actuator is operable to apply the tensile load to the tendon when at least one of the first side of the elongated structure is under a first tensile stress or the second side of the elongated structure is under a first compressive stress. The actuator is also operable to apply no load to the tendon when the first side and the second side of the elongated structure are not under stress. The tendon is non-coaxial with a central axis of the elongated structure and is aligned with at least one region of the elongated structure.

20 Claims, 9 Drawing Sheets

(56) References Cited

U.S. PATENT DOCUMENTS

| | | | |
|---|---|---|---|
| 7,699,270 B2 | 4/2010 | Longsinger et al. | |
| 8,205,840 B2 | 6/2012 | Mercier des Rochettes et al. | |
| 8,301,272 B2* | 10/2012 | Mankame | B81B 3/0094 700/19 |
| 2003/0102411 A1* | 6/2003 | Kota | B64C 3/48 244/219 |
| 2006/0157623 A1 | 7/2006 | Voglsinger et al. | |
| 2007/0114886 A1* | 5/2007 | D'Almeida | F16D 69/027 310/328 |
| 2007/0152106 A9* | 7/2007 | Perez-Sanchez | B64C 3/48 244/219 |
| 2010/0133387 A1* | 6/2010 | Wood | B64C 3/48 244/219 |
| 2010/0258680 A1* | 10/2010 | Mercier Des Rochettes | B64C 27/615 244/219 |
| 2014/0027538 A1* | 1/2014 | Webster | F02K 1/06 239/265.43 |
| 2014/0302261 A1 | 10/2014 | Cheung et al. | |

FOREIGN PATENT DOCUMENTS

| | | | | |
|---|---|---|---|---|
| EP | 1 630 798 A1 | 3/2006 | | |
| EP | 2233395 A1 * | 9/2010 | | B64C 23/065 |
| EP | 2 214 960 B1 | 2/2012 | | |

\* cited by examiner

US 10,272,984 B2

APPARATUSES AND METHODS FOR FLEXURALLY CONTROLLING ELONGATED STRUCTURES

BACKGROUND

Elongated structures, such as spars and stringers of an aircraft wing, may be subject to flexure or deformation when acted upon by dynamic external forces. In some cases, flexure of these structures produces harmonic resonance that increases in intensity with each cycle. Unexpected and/or uncontrolled flexure conditions may result in undesirable performance and/or a shortened service life of such elongated structures.

SUMMARY

Accordingly, apparatuses and methods, intended to address at least the above-identified concerns, would find utility.

The following is a non-exhaustive list of examples, which may or may not be claimed, of the subject matter according the present disclosure.

One example of the present disclosure relates to a flexurally controlled system. The flexurally controlled system comprises an elongated structure comprising a first end, a second end opposite the first end, a first side, a second side opposite the first side, and a central axis extending between the first end and the second end. The flexurally controlled system further comprises a tendon comprising a third end and a fourth end opposite the third end. The third end of the tendon is attached to the elongated structure at a first region of the elongated structure. The flexurally controlled system further comprises an actuator operable to apply tensile load to the tendon when at least one of the first side of the elongated structure is under a first tensile stress or the second side of the elongated structure is under a first compressive stress. The actuator is also operable to apply no load to the tendon when the first side and the second side of the elongated structure are not under stress. The fourth end of the tendon is attached to the actuator. The tendon is non-coaxial with the central axis of the elongated structure. The tendon is aligned with the second region of the elongated structure and the second region is spaced from the first region.

Another example of the present disclosure relates to an apparatus for flexurally controlling an elongated structure. The apparatus comprises a tendon comprising a third end and a fourth end opposite the third end. The third end of the tendon is attached to the elongated structure at a first region of the elongated structure. The apparatus further comprises an actuator operable to apply a tensile load to the tendon when at least one of a first side of the elongated structure is under a first tensile stress or a second side of the elongated structure is under a first compressive stress. The actuator is also operable to apply no load to the tendon when the first side and the second side of the elongated structure are not under stress. The fourth end of the tendon is attached to the actuator. The tendon is configured to be non-coaxial with the central axis of the elongated structure. The tendon is configured to be aligned with a second region of the elongated structure.

Yet another example of the present disclosure relates to a method of flexurally controlling an elongated structure. The method comprises applying a tensile load to a tendon when at least one of a first side of the elongated structure is under a first tensile stress or a second side of the elongated structure opposite the first side is under a first compressive stress. The method further comprises applying no load to the tendon when the first side and the second side of the elongated structure are not under stress. The tendon is non-coaxial with a central axis of the elongated structure. The tendon is coupled to the elongated structure at a first region of the elongated structure. The tendon is aligned with a second region of the elongated structure.

BRIEF DESCRIPTION OF THE DRAWINGS

Figure 1:
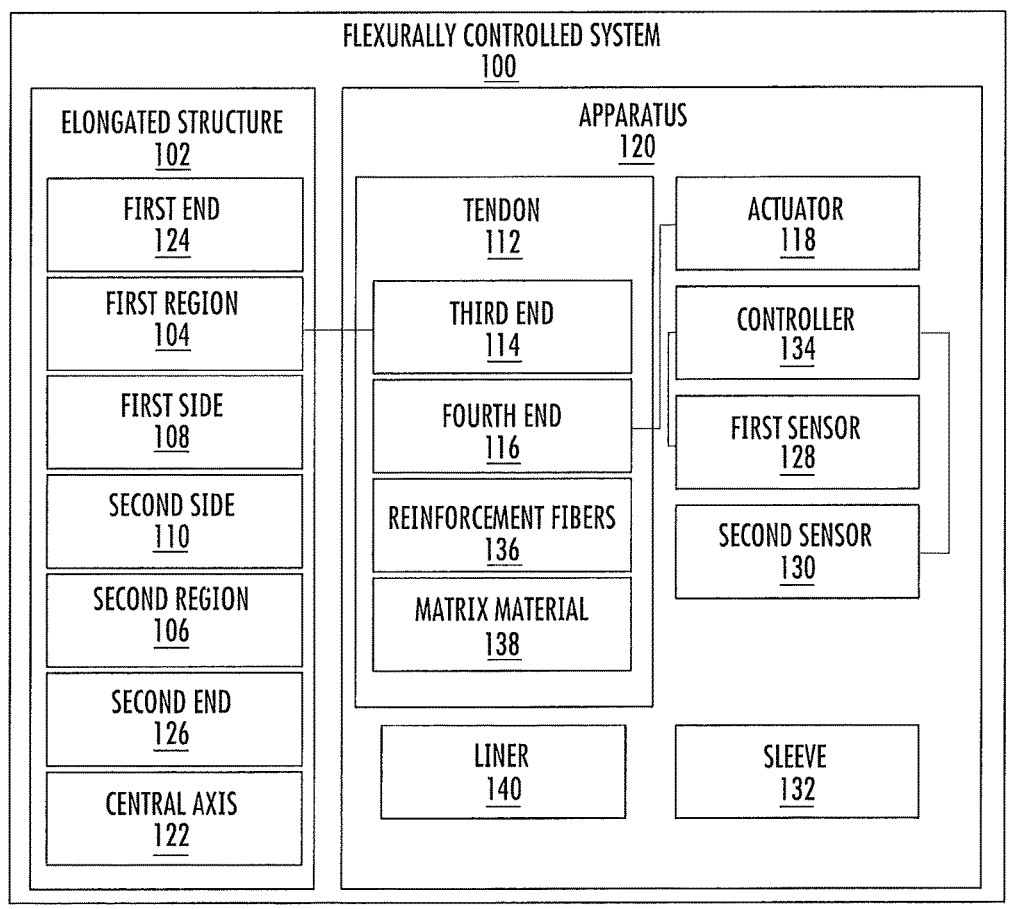
Figure 2:
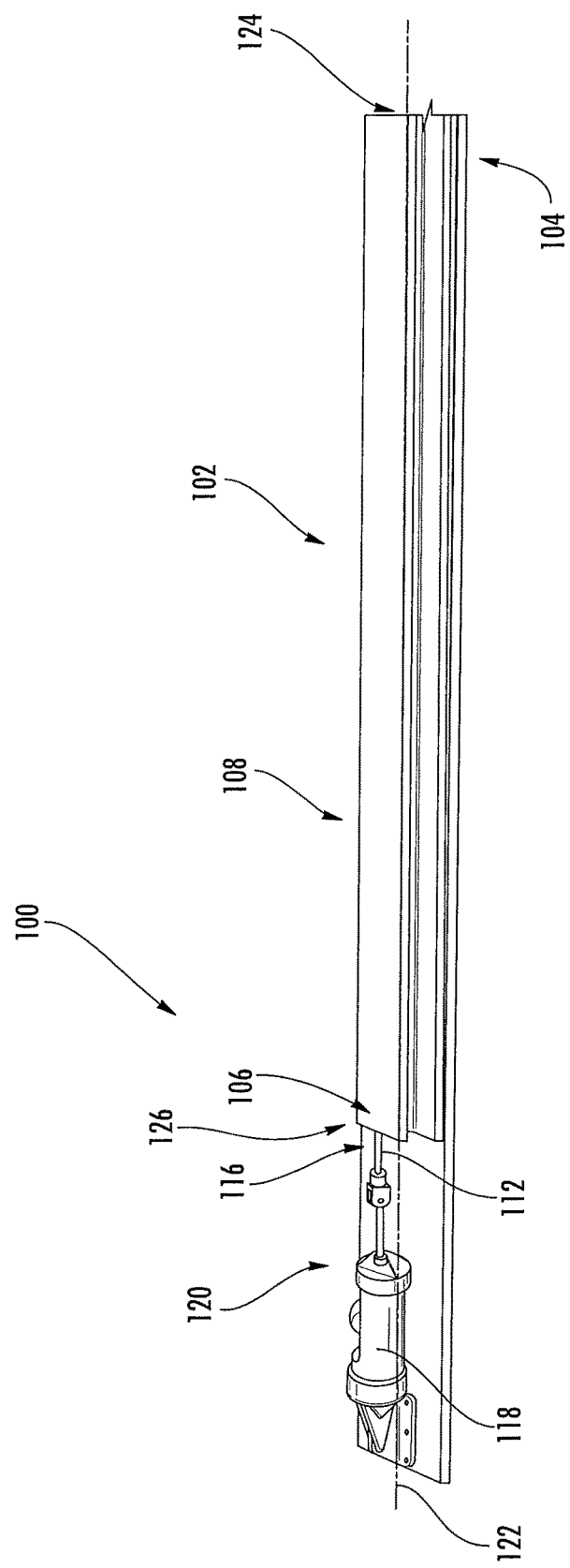
Figure 3A:
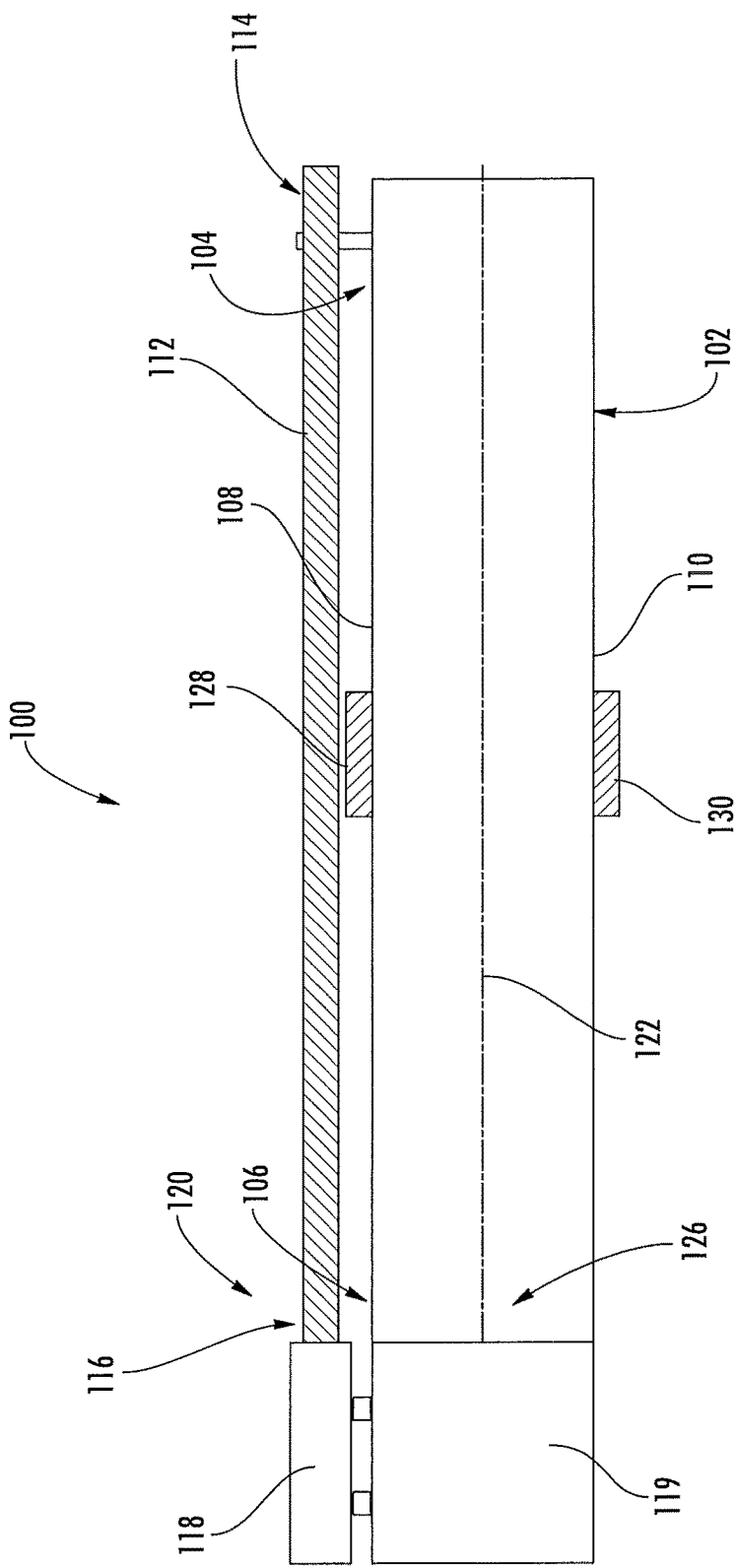
Figure 3B:
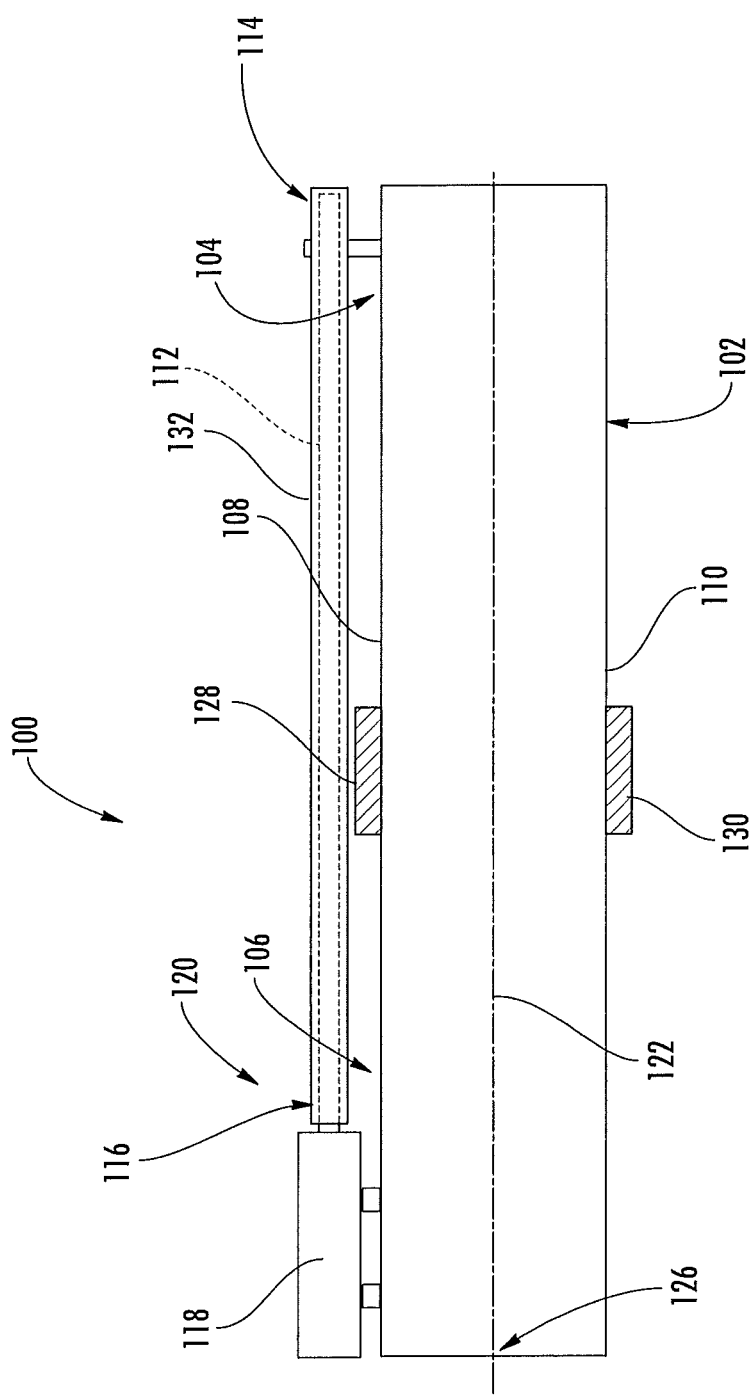
Figure 4:
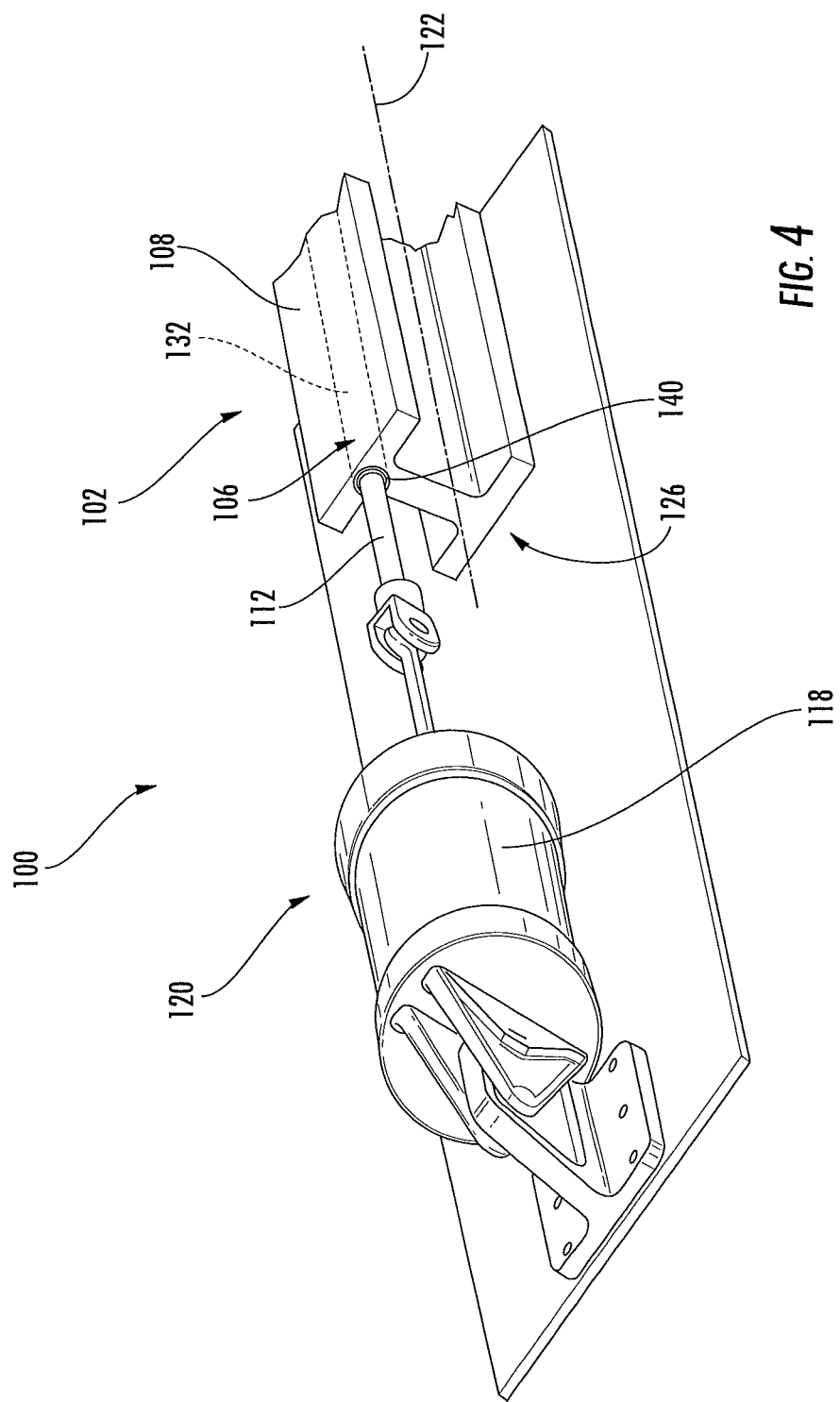
Figure 5:
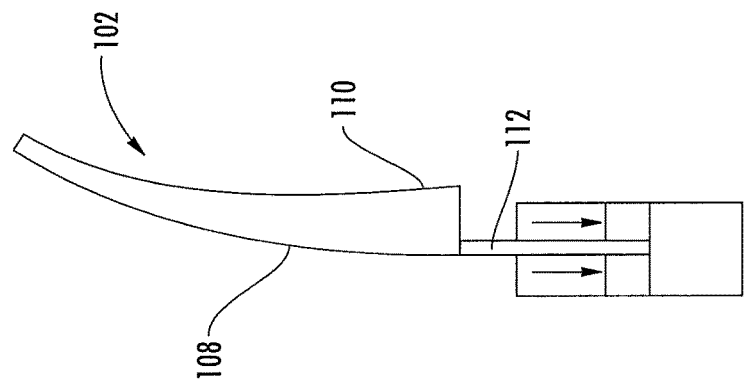
Figure 5:
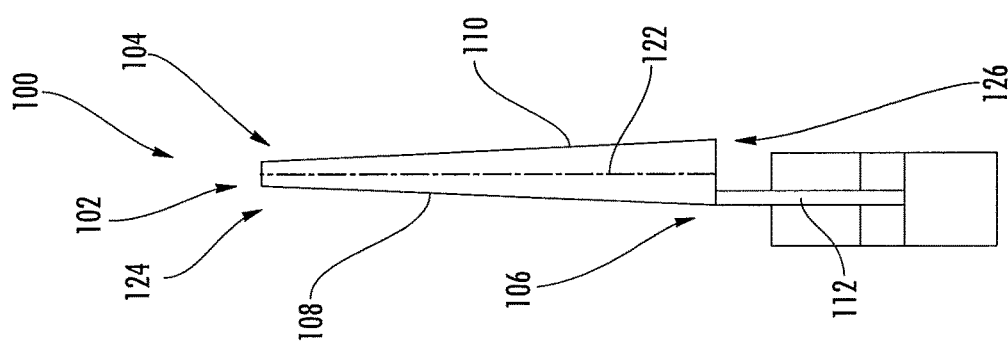
Figure 5:
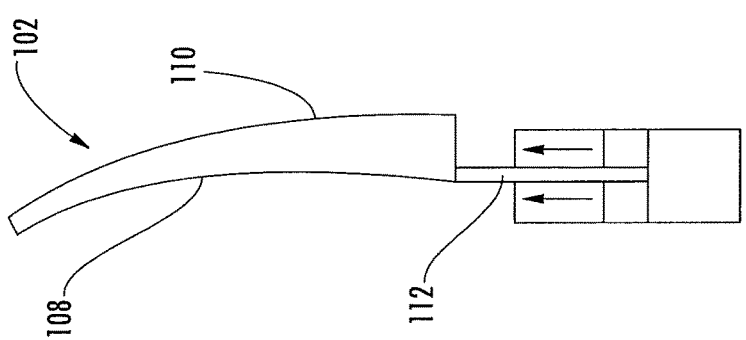
Figure 6:
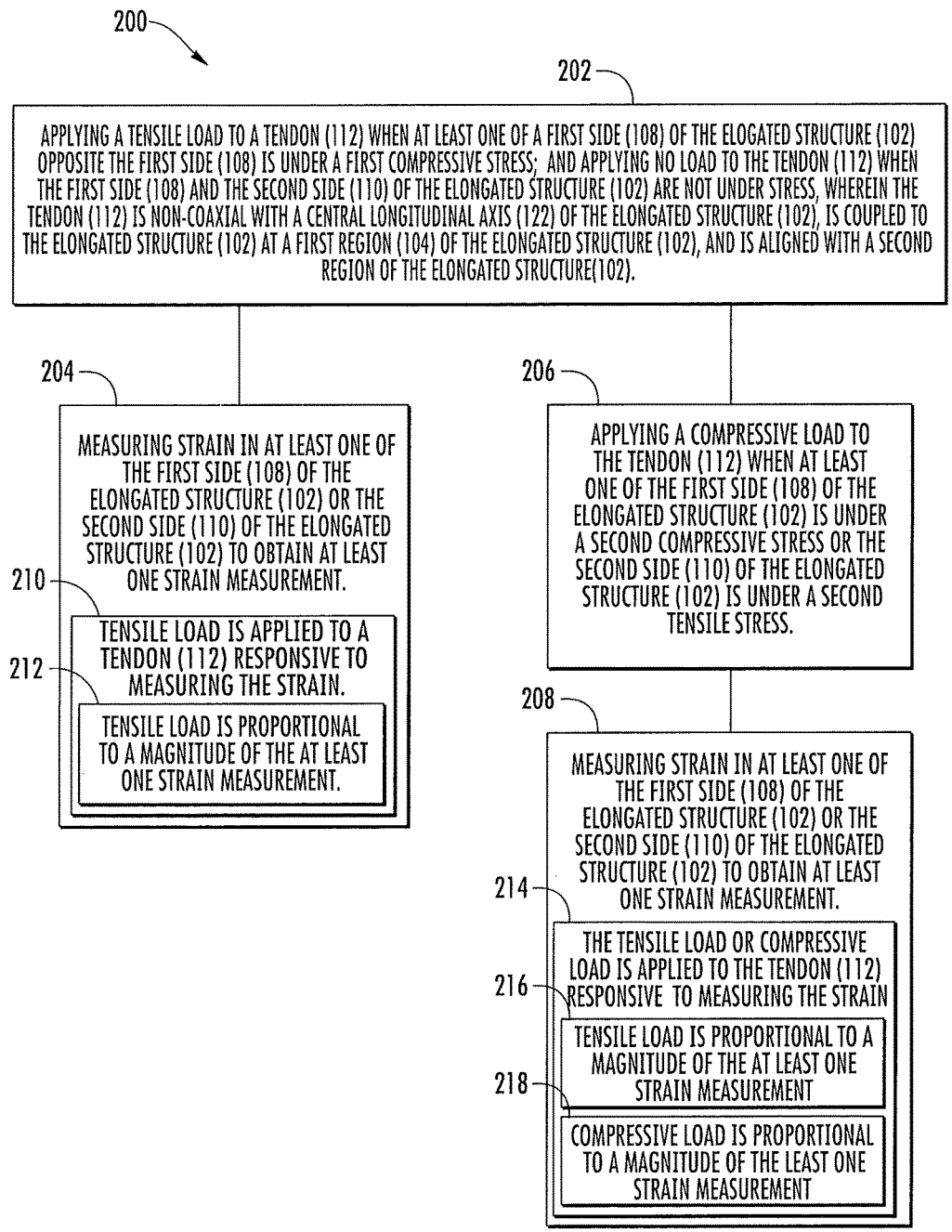
Figure 7:
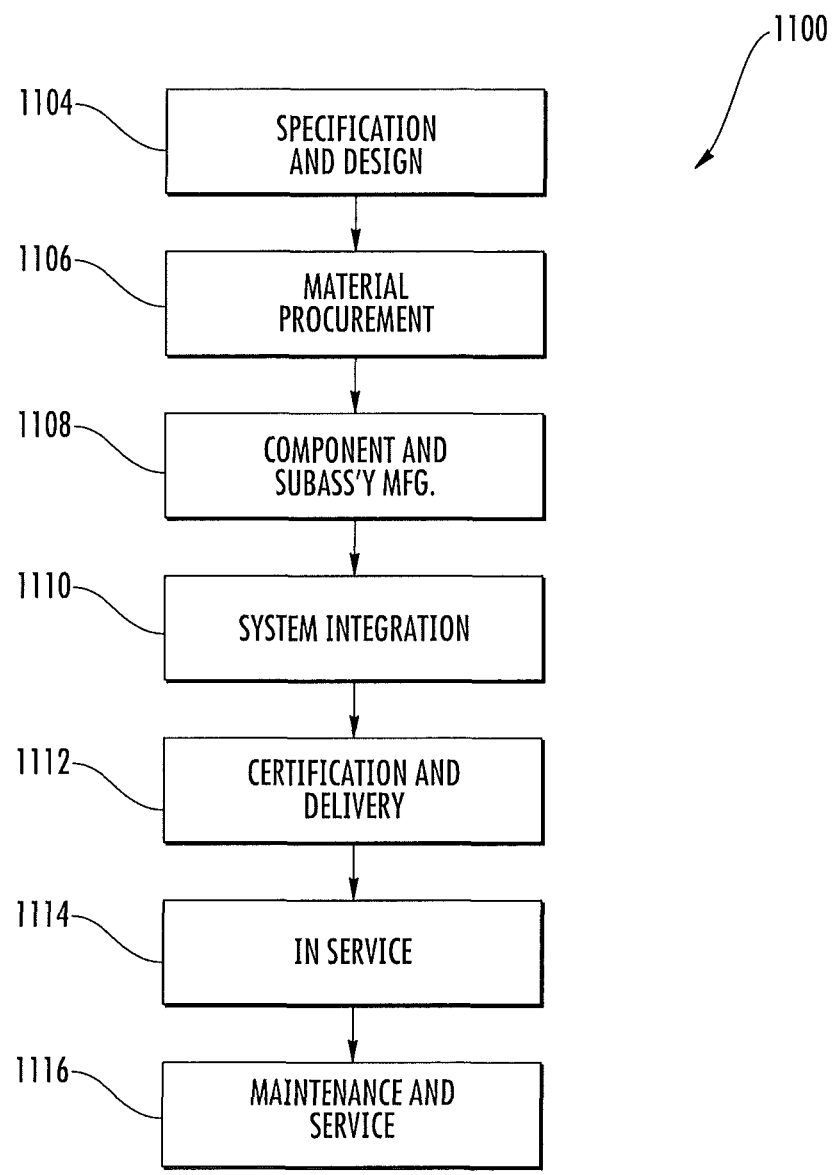
Figure 8:
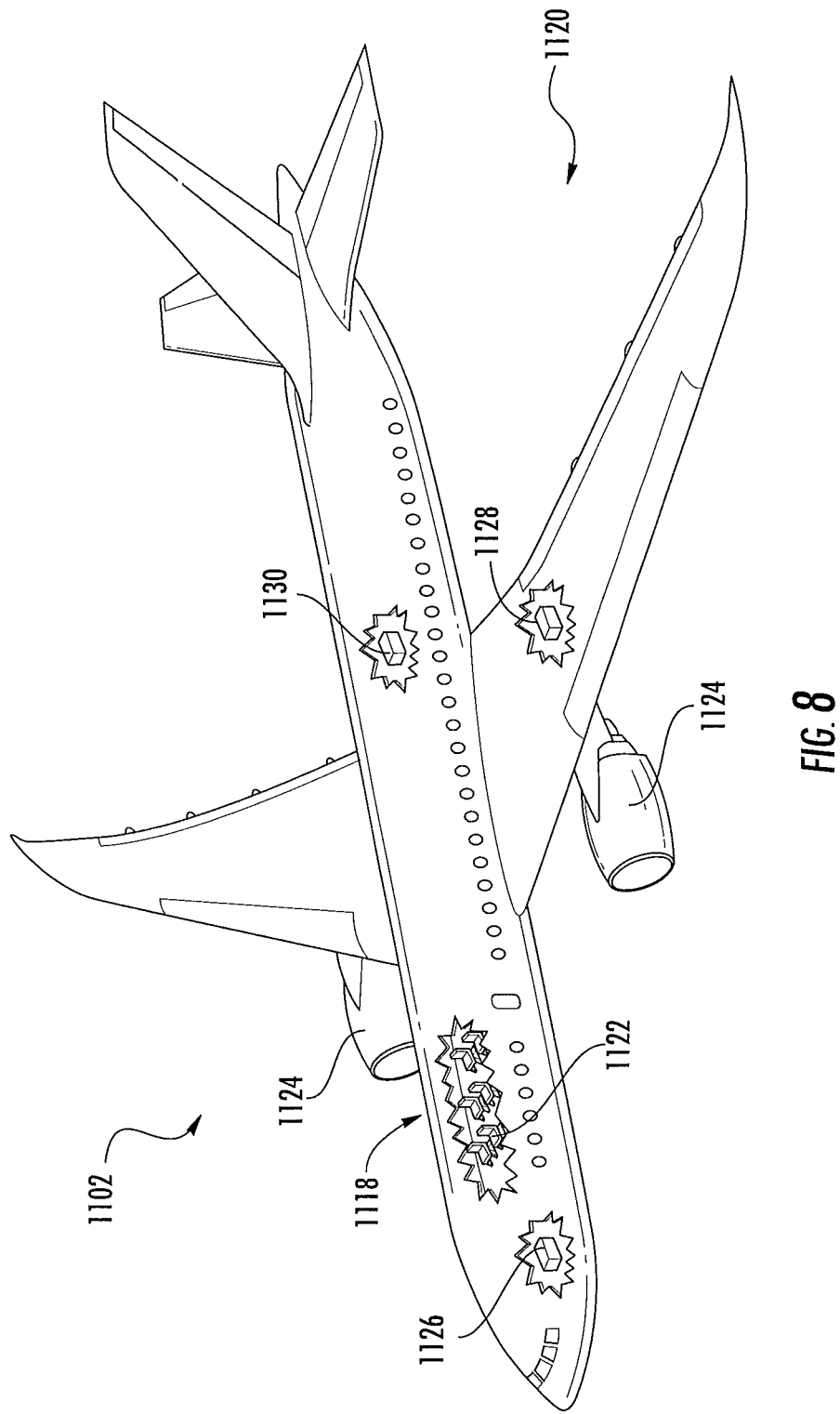

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a block diagram of a flexurally controlled system, according to one or more examples of the present disclosure;

FIG. 2 is a schematic perspective view of the flexurally controlled system of FIG. 1, according to one or more examples of the present disclosure;

FIG. 3A is a schematic side elevation view of the flexurally controlled system of FIG. 1, according to one or more examples of the present disclosure;

FIG. 3B is a schematic side elevation view of the flexurally controlled system of FIG. 1, according to one or more examples of the present disclosure;

FIG. 4 is a schematic perspective view of a portion of the flexurally controlled system of FIG. 1, according to one or more examples of the present disclosure;

FIG. 5 is a schematic view of the flexurally controlled system of FIG. 1 in various flexural states, according to one or more examples of the present disclosure;

FIG. 6 is a block diagram of a method of flexurally controlling an elongated structure, according to one or more examples of the present disclosure;

FIG. 7 is a block diagram of aircraft production and service methodology; and FIG. 8 is a schematic illustration of an aircraft.

DETAILED DESCRIPTION

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual imaginary elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

In FIGS. 6-8, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 6-8 and the accompanying disclosure describing the operations of the methods set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

Illustrative, non-exhaustive examples, which may or may not be claimed, of the subject matter according the present disclosure are provided below.

Referring generally to FIG. 1 and particularly to, e.g., FIGS. 2, 3A and 3B, flexurally controlled system 100 is disclosed. Flexurally controlled system 100 comprises elongated structure 102 comprising first end 124, second end 126 opposite first end 124, first side 108, second side 110 opposite first side 108, and central axis 122 extending between first end 124 and second end 126. Flexurally controlled system 100 further comprises tendon 112 comprising third end 114 and fourth end 116 opposite third end 114. Third end 114 of tendon 112 is attached to elongated structure 102 at first region 104 of elongated structure 102. Flexurally controlled system 100 also comprises actuator 118 operable to apply tensile load to tendon 112 when at least one of first side 108 of elongated structure 102 is under a first tensile stress or second side 110 of elongated structure 102 is under a first compressive stress. Actuator 118 is also operable to apply no load to tendon 112 when first side 108 and second side 110 of elongated structure 102 are not under stress. Fourth end 116 of tendon 112 is attached to actuator 118. Tendon 112 is non-coaxial with central axis 122 of elongated structure 102. Tendon 112 is aligned with second region 106 of elongated structure 102 and second region 106 is spaced from first region 104. The preceding subject matter of this paragraph characterizes example 1 of the present disclosure.

Application of a tensile load to tendon 112 when at least one of first side 108 of elongated structure 102 is under a first tensile stress or second side 110 of elongated structure 102 is under a first compressive stress minimizes flex or deformation of elongated structure 102. Minimizing flex or deformation can prevent resonant oscillation or oscillating deformation of elongated structure 102. Risk of uncontrolled flexure and/or risk of failure due to excessive deformation are thus decreased. In this manner, direction and degree of flexure within the elongated structure can be adjusted in a dynamic system, standing in contrast to a rigid system.

As used herein, a "central axis" of an object is a line (which may or may not be straight), passing through the centroid of each cross-section of the object, where each said cross-section of the object passes through (a) at least two points on the object's boundary equidistant from and closest to one point of the medial skeleton of the object and through at least two other points on the object's boundary equidistant from and closest to another point of the medial skeleton of the object or (b) at least three points on the object's boundary equidistant from and closest to one point of the medial skeleton of the object. A medial skeleton of an object is a set of points selected such that at least two points on the object's boundary are equidistant from and closest to each point of the set of points. The centroid (geometric center) of a two dimensional region is the "average" position of all the points in the two dimensional region.

Additionally, as used herein, a "region" of elongated structure 102 is a portion of at least one dimension of elongated structure. For example, a region can comprise or include a portion of a length dimension of at least one of first side 108 or second side 110 of elongated structure 102.

Further, as used herein, a "tensile load" applied to tendon 112 can be applied by any means or methods not inconsistent with the present disclosure. For example, actuator 118 can apply a pulling force to induce or apply a tensile load to tendon 112, causing tendon 112 to have a heightened or raised tensile stress than would be present within tendon 112 in a resting state or state of no load or zero load. A determination of whether a tensile load can be applied to tendon 112 by actuator 118 may be determined when a first tensile stress is present in first side 108 of elongated structure 102, when a first compressive stress is present in second side 110 of elongated structure 102, and/or when both a first tensile stress is present in first side 108 of elongated structure 102 and a first compressive stress is present in second side 110 of elongated structure 102. A first tensile stress and/or a first compressive stress may be present in combination with flexure or deformation of elongated structure 102 or, in some instances, may be present without flexure or deformation of elongated structure 102. For reference purposes herein, "attached" can indicate or otherwise illustrate that two or more components are connected to one another by any means, methods, or structure not inconsistent with the objectives of the present disclosure. For example, components or elements can be attached by permanent or non-permanent mechanical joining and/or by permanent or non-permanent bonding.

Moreover, as used herein, the term "non-coaxial" can indicate that tendon 112 and central axis 122 are disposed relative to one another at any angle. For example, tendon 112 and central axis 122 can be parallel to one another, orthogonal to one another, or oblique relative to one another, provided that tendon 112 and central axis 122 are neither coaxial nor collinear. The term "aligned," as used herein, indicates that tendon 112 lies within at least one plane parallel to second region 106 of elongated structure 102.

Referring generally to FIG. 1 and particularly to, e.g., FIGS. 2, 3A, and 3B, actuator 118 is also operable to apply a compressive load to tendon 112 when first side 108 of elongated structure 102 is under a second compressive stress or when second side 110 of elongated structure 102 is under a second tensile stress. The preceding subject matter of this paragraph characterizes example 2 of the present disclosure, wherein example 2 includes the subject matter of example 1, above.

Application of a compressive load to tendon 112 provides an additional dimension of force application to one or both of first side 108 of elongated structure 102 and/or second side 110 of elongated structure 102 in order to provide a greater degree of flexural control and/or characteristics of rigidity as may be necessary for a particular application.

A compressive load can be applied to tendon 112 in any manner or by any means not inconsistent with the objectives of the present disclosure. For example, actuator 118 can apply a pushing or pressing force to tendon 112 resulting in compression or compressive load being applied to tendon 112.

Referring generally to FIG. 1 and particularly to, e.g., FIGS. 3A, 3B, and 5, first region 104 of elongated structure 102 is proximate to first end 124 of elongated structure 102. Additionally, second region 106 of elongated structure 102 is proximate to second end 126 of elongated structure 102. The preceding subject matter of this paragraph characterizes example 3 of the present disclosure, wherein example 3 includes the subject matter of any one of examples 1 or 2, above.

Attaching tendon 112 at first region 104 of elongated structure in a position such that first region 104 is proximate first end 124 and attaching tendon 112 at second region 106 proximate to second end 126 of elongated structure 102 permits tensile load and/or compressive load applied to tendon 112 to control flexure at one or both of first end 124 and second end 126 more directly than implementations where tendon 112 is attached closer to a centermost point of one side of elongated structure 102. Greater control of flexure at either or both of first end 124 and/or second end 126 may permit application of a smaller load by actuator 118 to effect a similar level of flexural control over elongated structure 102.

As used herein, the term "proximate" can indicate that a region, such as first region 104 or second region 106, is located at or on an end, such as first end 124 or second end 126. The term "proximate" can also indicate that a region is nearer an end of elongated structure 102 than a center point of elongated structure 102.

Referring generally to FIG. 1 and particularly to, e.g., FIG. 3B, actuator 118 is attached to elongated structure 102 at second region 106 of elongated structure 102. The preceding subject matter of this paragraph characterizes example 4 of the present disclosure, wherein example 4 includes the subject matter of any one of examples 1-3, above.

Implementations in which actuator 118 is attached to elongated structure 102 permits flexural control of elongated structure 102 without necessity to provide external support or attachment for actuator 118.

Referring generally to FIG. 1 and particularly to, e.g., FIG. 3A, actuator 118 is attached to second structure 119, which is stationary relative to elongated structure 102. The preceding subject matter of this paragraph characterizes example 5 of the present disclosure, wherein example 5 includes the subject matter of any one of examples 1-3, above.

Actuator 118 can be attached to second structure 119 to provide a support or base for actuator 118 that is stationary or unmoving relative to elongated structure 102. In such a configuration, flexure or deformation of a portion of elongated structure 102 may have a reduced impact on tensile and/or compressive load applied to tendon 112 by actuator 118. Further, certain configurations of elongated structure 102 may not permit attachment of actuator 118 without provision of second structure 119.

Second structure 119 can comprise or include any structure not inconsistent with the objectives of the present disclosure. For example, in some implementations, elongated structure 102 comprises or includes a portion of or an entirety of an airplane wing. In such examples, second structure 119 can comprise or include an airplane chassis or other structural component of an aircraft that is stationary relative to elongated structure 102. Other configurations are also possible. For example, elongated structure 102 can comprise or include a beam or cantilevered structure. In such examples, second structure 119 can comprise or include any beam, box, wall, or other structure external to and/or stationary relative to elongated structure 102.

Referring generally to FIG. 1 and particularly to, e.g., FIGS. 3A and 3B, flexurally controlled system 100 further comprises first sensor 128 that is operatively coupled to first side 108 of elongated structure 102. The preceding subject matter of this paragraph characterizes example 6 of the present disclosure, wherein example 6 includes the subject matter of any one of examples 1-5, above.

Sensor 128 can provide one or more readings or measurements describing at least one property, status, or aspect of first side 108 of elongated structure. In such configurations, one or more actions may be carried out on tendon 112 and/or elongated structure 102 responsive to indications provided by first sensor 128.

First sensor 128 can comprise or include any type of sensor that may be adapted or configured to be operatively coupled to first side 108 of elongated structure 102. As used herein, "operatively coupled" indicates that first sensor 128 is attached, fastened, or otherwise coupled to first side 108 such that first sensor 128 is able to provide measurements indicating at least one parameter or status identifier of first side 108.

Referring generally to FIG. 1 and particularly to, e.g., FIGS. 3A and 3B, flexurally controlled system 100 further comprises second sensor 130 that is operatively coupled to second side 110 of elongated structure 102. The preceding subject matter of this paragraph characterizes example 7 of the present disclosure, wherein example 7 includes the subject matter of example 6, above.

Utilization of first sensor 128 on first side 108 with second sensor 130 with second side 110 can permit a user, operator, or automated system to determine properties of either or both of first side 108 and/or second side 110 to create a broader understanding of the status of first side 108 and second side 110 in order to react or respond in a manner which best controls flexure within elongated structure 102.

Referring generally to FIG. 1, flexurally controlled system 100 further comprises controller 134 that is operatively coupled to actuator 118, to first sensor 128, and to second sensor 130. The preceding subject matter of this paragraph characterizes example 8 of the present disclosure, wherein example 8 includes the subject matter of example 7, above.

Controller 134 operatively coupled to actuator 118, first sensor 128 and second sensor 130 permits an operator, automated system, or some combination of an operator and automated system to apply tensile load, compressive load, or no load to tendon 112 based on information provided by one or both of first sensor 128 and second sensor 130.

Controller 134 may be characterized as "operatively coupled" to actuator, 118 where controller is able to initiate or cease application of tensile or compressive load to tendon 112 by actuator 118. Controller 134 may be characterized as "operatively coupled" to first sensor 128 and/or second sensor 130 where controller 134 is operable to receive information from one or both of first sensor 128 and/or second sensor 130 which conveys measurements or readings taken by one or both sensors. Any controller can be used which is operable to perform the above-stated function(s).

Referring generally to FIG. 1, flexurally controlled system 100 further comprises controller 134 that is operatively coupled to actuator 118 and to first sensor 128. The preceding subject matter of this paragraph characterizes example 9 of the present disclosure, wherein example 9 includes the subject matter of example 6, above.

Controller 134 operatively coupled to actuator 118 and first sensor 128 permits an operator, automated system, or some combination of an operator and automated system to apply tensile load, compressive load, or no load to tendon 112 based on information provided by first sensor 128.

Referring generally to FIG. 1 and particularly to, e.g., FIG. 4, flexurally controlled system 100 further comprises sleeve 132. Sleeve 132 at least partially encloses tendon 112. The preceding subject matter of this paragraph characterizes example 10 of the present disclosure, wherein example 10 includes the subject matter of any one of examples 1-9, above.

Sleeve 132 can perform one or more functions in flexurally controlled system 100. In some implementations, sleeve 132 can shield or protect tendon 112 from external debris or other damage sources. Further, sleeve 132 can provide rigid outer structure which restricts expansion in a width dimension of tendon 112. In this manner, application of compressive load to tendon 112 can provide a push-like force along a length of tendon 112 where energy may be expended outward by expansion in the width dimension in the absence of sleeve 132.

Sleeve 132 can comprise or include any material and/or have any dimensions not inconsistent with the objectives of the present disclosure. For example, in some examples, sleeve 132 is made from a metal or metal alloy, such as titanium or a titanium alloy. In some implementations, sleeve 132 comprises or is formed from a material providing sufficient rigidity as to achieve the above-described expansion-restriction function. Partial enclosure, may comprise or include enclosure along a portion of tendon 112 longitudinally. Additionally or alternatively, partial enclosure of tendon 112 with sleeve 132 can comprise or include partial enclosure circumferentially around tendon 112. In some implementations, partial enclosure includes fully surrounding tendon 112 in one of a longitudinal or circumferential dimension while only partially enclosing tendon 112 in the remaining dimension. At least partial enclosure can further comprise or include complete enclosure as described herein below in example 14.

Referring generally to FIG. 1 and particularly to, e.g., FIG. 4, sleeve 132 is internal to elongated structure 102. The preceding subject matter of this paragraph characterizes example 11 of the present disclosure, wherein example 11 includes the subject matter of example 10, above.

Disposing sleeve 132 internal to elongated structure 102 can provide an additional layer of protection from debris or other external sources of damage for tendon 112. Where concern for deformation or damage of sleeve 132 is reduced, sleeve 132 can be created or formed using a thinner layer of material than may be practical for an implementation in which sleeve 132 is external to elongated structure 102.

Referring generally to FIG. 1 and particularly to, e.g., FIG. 4, sleeve 132 is positioned within elongated structure 102 with a longitudinal clearance fit. The preceding subject matter of this paragraph characterizes example 12 of the present disclosure, wherein example 12 includes the subject matter of example 11, above.

Positioning sleeve 132 within elongated structure 102 with a longitudinal clearance fit permits longitudinal movement and/or expansion in a width dimension of sleeve 132 without interference or abrasion by elongated structure 102. Wear to sleeve 132 is therefore reduced. Further, in some implementations, movement of sleeve 132 relative to elongated body 102 may permit more efficient control of flexure of elongated structure 102 where sleeve 132 is responsible for at least a portion of transference of tensile and/or compressive load.

As used herein, a "longitudinal clearance fit" indicates that sleeve 132 is disposed within a recess or cavity within elongated structure 102 such that sleeve 132 does not contact elongated structure 102 along a length of sleeve 132.

Referring generally to FIG. 1 and particularly to, e.g., FIG. 3B, sleeve 132 is external to elongated structure 102. The preceding subject matter of this paragraph characterizes example 13 of the present disclosure, wherein example 13 includes the subject matter of example 10, above.

Implementations utilizing sleeve 132 external to elongated structure 102 can facilitate repair or routine maintenance of sleeve 132 and/or tendon 112 without total removal of one or both components. Additionally, utilizing such a configuration permits installation of sleeve 132 and tendon 112 in configurations where disposing sleeve 132 is impractical. For example, a configuration wherein sleeve 132 is external to elongated structure 102 permits facile installation after assembly or construction of elongated structure 102 without additional machining or material removal steps.

Referring generally to FIG. 1 and particularly to, e.g., FIG. 3B, sleeve 132 completely encloses tendon 112. The preceding subject matter of this paragraph characterizes example 14 of the present disclosure, wherein example 14 includes the subject matter of any one of examples 10-13, above.

Complete enclosure of tendon 112 provides technical benefits consistent with example 10 above. Such a configuration ensures that increased protection of tendon 112 is achieved. Complete enclosure of tendon 112 by sleeve 132 further maximizes utility of compressive load application as set forth in example 10 above.

Complete enclosure of tendon 112 includes enclosure of tendon 112 fully in both a longitudinal and circumferential direction.

Referring generally to FIG. 1 and particularly to, e.g., FIGS. 2 and 4, at least a portion of tendon 112 is internal to elongated structure 102. The preceding subject matter of this paragraph characterizes example 15 of the present disclosure, wherein example 15 includes the subject matter of any one of examples 1-12, above.

Disposing at least a portion of tendon 112 internal to elongated structure 102 can provide protection from debris or other external damage sources in addition to or in place of utilizing sleeve 132.

At least a portion of tendon 112 being disposed internal to elongated structure 102 can comprise partial or full enclosure in one or more of longitudinal and/or circumferential dimensions. For example, disposing at least a portion of tendon 112 internal to elongated structure 102 can comprise full enclosure circumferentially of tendon 112 along at least a portion or all of a longitudinal dimension of tendon 112.

Referring generally to FIG. 1 and particularly to, e.g., FIG. 4, at least the portion of tendon 112 internal to elongated structure 102 is at least partially surrounded by liner 140. Liner 140 is configured to reduce friction between tendon 112 and elongated structure 102. The preceding subject matter of this paragraph characterizes example 16 of the present disclosure, wherein example 16 includes the subject matter of example 15, above.

Liner can provide friction reduction between tendon 112 and elongated structure 102. Thus a service life of tendon 112 is increased.

As used herein, the term "configured to reduce friction" refers to reduction of friction relative to configurations not utilizing liner 140. Liner 140 can comprise or include any coating or material operable to provide reduced friction between tendon 112 and elongated structure 102 relative to a configuration having no liner. One non-limiting example of such a liner comprises or includes TEFLON® and/or TEFLON® containing coatings commercially available from DuPont.

Referring generally to FIG. 1 and particularly to, e.g., FIGS. 3A and 3B, tendon 112 is external to elongated structure 102. The preceding subject matter of this paragraph characterizes example 17 of the present disclosure, wherein example 17 includes the subject matter of any one of examples 1-10 or 13, above.

Configurations in which tendon 112 is external to elongated structure 102 can provide facile installation, removal, and/or replacement of tendon 112 without disassembly or modification of elongated structure. For example, such a configuration can permit an operator to install tendon 112 onto a preexisting or preconstructed elongated structure not previously adapted or optimized for utility with tendon 112.

Referring generally to FIG. 1, tendon 112 comprises reinforcement fibers 136. The preceding subject matter of this paragraph characterizes example 18 of the present disclosure, wherein example 18 includes the subject matter of any one of examples 1-17, above.

Provision of reinforcement fibers 136 as a component of tendon 112 can serve to increase tensile modulus and/or otherwise increase strength and/or durability of tendon 112. In this manner, tendon 112 can apply a push or pull force with reduced risk of damage to tendon 112 and/or with reduced deformation or elastic flexure.

Reinforcement fibers 136 can comprise or include any materials or components suitable for reinforcing, such as by increase of modulus of elasticity or increase in wear resistance or tear resistance.

Referring generally to FIG. 1, reinforcement fibers 136 comprise carbon. The preceding subject matter of this paragraph characterizes example 19 of the present disclosure, wherein example 19 includes the subject matter of example 18, above.

Reinforcement fibers 136 comprising carbon can provide desirable characteristics set forth in example 18, above, while minimizing additional weight of tendon 112 to overall weight of flexurally controlled system 100.

Reinforcement fibers 136 can comprise carbon in any amount. For example, in some implementations, reinforcement fibers 136 are entirely or substantially entirely formed from carbon. In certain other implementations, reinforcement fibers 136 comprise or contain carbon and one or more additional materials.

Referring generally to FIG. 1, tendon 112 comprises reinforcement fibers 136 and matrix material 138 impregnated into reinforcement fibers 136. The preceding subject matter of this paragraph characterizes example 20 of the present disclosure, wherein example 20 includes the subject matter of any one of examples 1-17, above.

Addition of matrix material with reinforcement fibers 136 can provide a high-performance fiber composite yielding a structure for tendon 112 which is superior in one or more of strength and/or durability.

Matrix material 138 can form a continuous phase with a discontinuous phase comprising or formed from reinforcement fibers 136 to produce a composite structure for tendon 112. Matrix material can comprise or include any material. Further discussion of non-limiting examples of suitable materials is provided herein below in examples 21 and 22.

Referring generally to FIG. 1, matrix material 138 comprises a thermosetting resin. The preceding subject matter of this paragraph characterizes example 21 of the present disclosure, wherein example 21 includes the subject matter of example 20, above.

Utilization of a thermosetting resin for matrix material 138 can permit molding at least a portion of the structure for tendon 112 permitting custom construction. Further, such materials generally provide resistance to deformation by heating, as thermosetting resins are frequently irreversibly cured after initial heating, chemical reaction or irradiation.

Any suitable thermosetting resin can be utilized. Certain non-limiting examples comprise or include one or more of polyurethanes, vulcanized rubber, phenol-formaldehyde resins, urea-formaldehyde foams, melamine resins, diallyl-phthalate, epoxy resins, polyimides, cyanate esters, and/or polyester resins. Such materials can be molded or formed by any method such as injection molding, extrusion molding, compression molding and/or spin casting. Additionally, where such materials are cured, curing may be performed by any method such as heating, chemical reaction and/or irradiation.

Referring generally to FIG. 1, matrix material 138 comprises a thermoplastic resin. The preceding subject matter of this paragraph characterizes example 22 of the present disclosure, wherein example 22 includes the subject matter of example 20, above.

Utilization of thermoplastic resins can permit remolding or reforming of tendon 112 for recycling, refurbishing or other repair purposes.

Any thermoplastic or thermosoftening plastic can be used. Such materials can become pliable or moldable above a specific temperature and resolidified upon cooling. Certain non-limiting materials which may be suitable for such utility comprise or include acrylics (such as poly(methyl methacrylate)), acrylonitrile butadiene styrene (ABS), nylon, polylactic acid, poly benzimidazole, polycarbonate, polyether sulfone, polyetherether ketone, polyetherimide, polyethylene, polyphenylene oxide, polyphenylene sulfide, polypropylene, polystyrene, polyvinyl chloride (PVC), and/or TEFLON.

Referring generally to FIG. 1 and particularly to, e.g., FIGS. 2, 3A, 3B and 4, apparatus 120 for flexurally controlling elongated structure 102 is disclosed. Apparatus 120 comprises tendon 112 comprising third end 114 and fourth end 116 opposite third end 114. Third end 114 of tendon 112 is configured to be attached to elongated structure 102 at first region 104 of elongated structure 102. Apparatus 120 further comprises actuator 118 operable to apply tensile load to tendon 112 when at least one of first side 108 of elongated structure 102 is under a first tensile stress or second side 110 of elongated structure 102 is under a first compressive stress. Actuator 118 is also operable to apply no load to tendon 112 when first side 108 and second side 110 of elongated structure 102 are not under stress. Fourth end 116 of tendon 112 is attached to actuator 118. Tendon 112 is configured to be non-coaxial with central axis 122 of elongated structure 102. Tendon 112 is configured to be aligned with second region 106 of elongated structure 102. The preceding subject matter of this paragraph characterizes example 23 of the present disclosure.

Application of a tensile load to tendon 112 when at least one of first side 108 of elongated structure 102 is under a first tensile stress or second side 110 of elongated structure 102 is under a first compressive stress minimizes flex or deformation of elongated structure 102. Minimizing flex or deformation can prevent resonant oscillation or oscillating deformation of elongated structure 102. Risk of uncontrolled flexure and/or risk of failure due to excessive deformation are thus decreased. In this manner, direction and degree of flexure within the elongated structure can be adjusted in a dynamic system, standing in contrast to a rigid system.

Referring generally to FIG. 1 and particularly to, e.g., FIGS. 2, 3A, 3B and 4, actuator 118 is also operable to apply compressive load to tendon 112 when at least one of first side 108 of elongated structure 102 is under a second compressive stress or second side 110 of elongated structure 102 is under a second tensile stress. The preceding subject matter of this paragraph characterizes example 24 of the present disclosure, wherein example 24 includes the subject matter of example 23, above.

Application of a compressive load to tendon 112 provides an additional dimension of force application to one or both of first side 108 of elongated structure 102 and/or second side 110 of elongated structure 102 in order to provide a greater degree of flexural control and/or characteristics of rigidity as may be necessary for a particular application.

Referring generally to FIG. 1 and particularly to, e.g., FIG. 5, first region 104 of elongated structure 102 is proximate to first end 124 of elongated structure 102. Second region 106 on elongated structure 102 is proximate to second end 126 of elongated structure 102. The preceding subject matter of this paragraph characterizes example 25 of the present disclosure, wherein example 25 includes the subject matter of any one of examples 23 or 24, above.

Attaching tendon 112 at first region 104 of elongated structure in a position such that first region 104 is proximate first end 124 and attaching tendon 112 at second region 106 proximate to second end 126 of elongated structure 102 permits tensile load and/or compressive load applied to tendon 112 to control flexure at one or both of first end 124 and second end 126 more directly than implementations where tendon 112 is attached closer to a centermost point of one side of elongated structure 102. Greater control of flexure at either or both of first end 124 and/or second end 126 may permit application of a smaller load by actuator 118 to effect a similar level of flexural control over elongated structure 102.

Referring generally to FIG. 1 and particularly to, e.g., FIG. 3B, actuator 118 is configured to be attached to elongated structure 102 at second region 106 of elongated structure 102. The preceding subject matter of this paragraph characterizes example 26 of the present disclosure, wherein example 26 includes the subject matter of any one of examples 23-25, above.

Implementations in which actuator 118 is attached to elongated structure 102 permits flexural control of elongated structure 102 without necessity to provide external support or attachment for actuator 118.

Referring generally to FIG. 1 and particularly to, e.g., FIG. 3A, actuator 118 is configured to be attached to second structure 119, which is stationary relative to elongated structure 102. The preceding subject matter of this paragraph characterizes example 27 of the present disclosure, wherein example 27 includes the subject matter of any one of examples 23-25, above.

Actuator 118 can be attached to second structure 119 to provide a support or base for actuator 118 that is stationary or unmoving relative to elongated structure 102. In such a configuration, flexure or deformation of a portion of elongated structure 102 may have a reduced impact on tensile and/or compressive load applied to tendon 112 by actuator 118. Further, certain configurations of elongated structure 102 may not permit attachment of actuator 118 without provision of second structure 119.

Referring generally to FIG. 1 and particularly to, e.g., FIGS. 3A and 3B, apparatus 120 further comprises first sensor 128 that is configured to be operatively coupled to first side 108 of elongated structure 102. The preceding subject matter of this paragraph characterizes example 28 of the present disclosure, wherein example 28 includes the subject matter of any one of examples 23-27, above.

Sensor 128 can provide one or more readings or measurements describing at least one property, status, or aspect of first side 108 of elongated structure. In such configurations, one or more actions may be carried out on tendon 112 and/or elongated structure 102 responsive to indications provided by first sensor 128.

Referring generally to FIG. 1 and particularly to, e.g., FIGS. 3A and 3B, apparatus 120 further comprises second sensor 130 that is configured to be operatively coupled to second side 110 of elongated structure 102. The preceding subject matter of this paragraph characterizes example 29 of the present disclosure, wherein example 29 includes the subject matter of example 28, above.

Utilization of first sensor 128 on first side 108 with second sensor 130 with second side 110 can permit a user, operator, or automated system to determine properties of either or both of first side 108 and/or second side 110 to create a broader understanding of the status of first side 108 and second side 110 in order to react or respond in a manner which best controls flexure within elongated structure 102.

Referring generally to FIG. 1, apparatus 120 further comprises controller 134 that is operatively coupled to actuator 118, to first sensor 128, and to second sensor 130. The preceding subject matter of this paragraph characterizes example 30 of the present disclosure, wherein example 30 includes the subject matter of example 29, above.

Controller 134 operatively coupled to actuator 118, first sensor 128 and second sensor 130 permits an operator, automated system, or some combination of an operator and automated system to apply tensile load, compressive load, or no load to tendon 112 based on information provided by one or both of first sensor 128 and second sensor 130.

Referring generally to FIG. 1, apparatus 120 further comprises controller 134 that is operatively coupled to actuator 118 and to first sensor 128. The preceding subject matter of this paragraph characterizes example 31 of the present disclosure, wherein example 31 includes the subject matter of example 28, above.

Controller 134 operatively coupled to actuator 118 and first sensor 128 permits an operator, automated system, or some combination of an operator and automated system to apply tensile load, compressive load, or no load to tendon 112 based on information provided by first sensor 128.

Referring generally to FIG. 1 and particularly to, e.g., FIG. 4, apparatus 120 further comprises sleeve 132 that at least partially encloses tendon 112. The preceding subject matter of this paragraph characterizes example 32 of the present disclosure, wherein example 32 includes the subject matter of any one of examples 23-31, above.

Sleeve 132 can perform one or more functions in flexurally controlled system 100. In some implementations, sleeve 132 can shield or protect tendon 112 from external debris or other damage sources. Further, sleeve 132 can provide rigid outer structure which restricts expansion in a width dimension of tendon 112. In this manner, application of compressive load to tendon 112 can provide a push-like force along a length of tendon 112 where energy may be expended outward by expansion in the width dimension in the absence of sleeve 132.

Referring generally to FIG. 1 and particularly to, e.g., FIG. 4, sleeve 132 is configured to be internal to elongated structure 102. The preceding subject matter of this paragraph characterizes example 33 of the present disclosure, wherein example 33 includes the subject matter example 32, above.

Disposing sleeve 132 internal to elongated structure 102 can provide an additional layer of protection from debris or other external sources of damage for tendon 112. Where concern for deformation or damage of sleeve 132 is reduced, sleeve 132 can be created or formed using a thinner layer of material than may be practical for an implementation in which sleeve 132 is external to elongated structure 102.

Referring generally to FIG. 1 and particularly to, e.g., FIG. 4, sleeve 132 is configured to be positioned within elongated structure 102 with a longitudinal clearance fit. The preceding subject matter of this paragraph characterizes example 34 of the present disclosure, wherein example 34 includes the subject matter of example 33, above.

Positioning sleeve 132 within elongated structure 102 with a longitudinal clearance fit accounts for any differential lengthwise expansion and contraction of sleeve 132 and elongated structure 102 to avoid binding between elongated structure 102 and sleeve 132, which could cause damage to the sleeve and/or the structure.

Referring generally to FIG. 1 and particularly to, e.g., FIG. 3B, sleeve 132 is configured to be external to elongated structure 102. The preceding subject matter of this paragraph characterizes example 35 of the present disclosure, wherein example 35 includes the subject matter of example 32, above.

Implementations utilizing sleeve 132 external to elongated structure 102 can facilitate repair or routine maintenance of sleeve 132 and/or tendon 112 without total removal of one or both components. Additionally, utilizing such a configuration permits installation of sleeve 132 and tendon 112 in configurations where disposing sleeve 132 is impractical. For example, a configuration wherein sleeve 132 is external to elongated structure 102 permits facile installation after assembly or construction of elongated structure 102 without additional machining or material removal steps.

Referring generally to FIG. 1 and particularly to, e.g. FIG. 3B, sleeve 132 completely encloses tendon 112. The preceding subject matter of this paragraph characterizes example 36 of the present disclosure, wherein example 36 includes the subject matter of any one of examples 32-35, above.

Complete enclosure of tendon 112 provides technical benefits consistent with example 32 above. Such a configuration ensures that increased protection of tendon 112 is achieved. Complete enclosure of tendon 112 by sleeve 132 further maximizes utility of compressive load application as set forth in example 32 above.

Referring generally to FIG. 1 and particularly to, e.g., FIGS. 2, 4 and 5, at least a portion of tendon 112 is configured to be internal to elongated structure 102. The preceding subject matter of this paragraph characterizes example 37 of the present disclosure, wherein example 37 includes the subject matter of any one of examples 23-34, above.

Disposing at least a portion of tendon 112 internal to elongated structure 102 can provide protection from debris or other external damage sources in addition to or in place of utilizing sleeve 132.

Referring generally to FIG. 1 and particularly to, e.g., FIG. 4, at least a portion of tendon 112, configured to be internal to elongated structure 102, is at least partially surrounded by liner 140. Liner 140 is configured to reduce friction between tendon 112 and elongated structure 102. The preceding subject matter of this paragraph characterizes example 38 of the present disclosure, wherein example 38 includes the subject matter of example 37, above.

Liner can provide friction reduction between tendon 112 and elongated structure 102. Thus a service life of tendon 112 is increased.

Referring generally to FIG. 1 and particularly to, e.g., FIGS. 3A and 3B, tendon 112 is configured to be external to elongated structure 102. The preceding subject matter of this paragraph characterizes example 39 of the present disclosure, wherein example 39 includes the subject matter of any one of examples 23-32 or 35, above.

Configurations in which tendon 112 is external to elongated structure 102 can provide facile installation, removal, and/or replacement of tendon 112 without disassembly or modification of elongated structure. For example, such a configuration can permit an operator to install tendon 112 onto a preexisting or preconstructed elongated structure not previously adapted or optimized for utility with tendon 112.

Referring generally to FIG. 1, tendon 112 comprises reinforcement fibers 136. The preceding subject matter of this paragraph characterizes example 40 of the present disclosure, wherein example 40 includes the subject matter of any one of examples 23-39, above.

Provision of reinforcement fibers 136 as a component of tendon 112 can serve to increase tensile modulus and/or otherwise increase strength and/or durability of tendon 112. In this manner, tendon 112 can apply a push or pull force with reduced risk of damage to tendon 112 and/or with reduced deformation or elastic flexure.

Referring generally to FIG. 1, reinforcement fibers 136 comprise carbon. The preceding subject matter of this paragraph characterizes example 41 of the present disclosure, wherein example 41 includes the subject matter of example 40, above.

Reinforcement fibers 136 comprising carbon can provide desirable characteristics set forth in example 40, above, while minimizing additional weight of tendon 112 to overall weight of flexurally controlled system 100.

Referring generally to FIG. 1, tendon 112 comprises reinforcement fibers 136 and matrix material 138 impregnated into reinforcement fibers 136. The preceding subject matter of this paragraph characterizes example 42 of the present disclosure, wherein example 42 includes the subject matter of any one of examples 23-39, above.

Addition of matrix material with reinforcement fibers 136 can provide a high-performance fiber composite yielding a structure for tendon 112 which is superior in one or more of strength and/or durability.

Referring generally to FIG. 1, matrix material 138 comprises a thermosetting resin. The preceding subject matter of this paragraph characterizes example 43 of the present disclosure, wherein example 43 includes the subject matter of example 42, above.

Utilization of a thermosetting resin for matrix material 138 can permit molding at least a portion of the structure for tendon 112 permitting custom construction. Further, such materials generally provide resistance to deformation by heating, as thermosetting resins are frequently irreversibly cured after initial heating, chemical reaction or irradiation.

Referring generally to FIG. 1, matrix material 138 comprises a thermoplastic resin. The preceding subject matter of this paragraph characterizes example 44 of the present disclosure, wherein example 44 includes the subject matter of example 42, above.

Utilization of thermoplastic resins can permit remolding or reforming of tendon 112 for recycling, refurbishing or other repair purposes.

Referring generally to FIGS. 2, 3A, 3B and 5, and particularly to FIG. 6 (block 202), method 200 of flexurally controlling elongated structure 102 is disclosed. Method 200 comprises applying a tensile load to tendon 112 when at least one of first side 108 of elongated structure 102 is under a first tensile stress or second side 110 of elongated structure 102 opposite first side 108 is under a first compressive stress. Method 200 further comprises applying no load to tendon 112 when first side 108 and second side 110 of elongated structure 102 are not under stress. Tendon 112 is non-coaxial with central axis 122 of elongated structure 102. Tendon 112 is coupled to elongated structure 102 at first region 104 of elongated structure 102. Tendon 112 is aligned with second region 106 of elongated structure 102. The preceding subject matter of this paragraph characterizes example 45 of the present disclosure.

Application of a tensile load to tendon 112 when at least one of first side 108 of elongated structure 102 is under a first tensile stress or second side 110 of elongated structure 102 is under a first compressive stress minimizes flex or deformation of elongated structure 102. Minimizing flex or deformation can prevent resonant oscillation or oscillating deformation of elongated structure 102. Risk of uncontrolled flexure and/or risk of failure due to excessive deformation are thus decreased. In this manner, direction and degree of flexure within the elongated structure can be adjusted in a dynamic system, standing in contrast to a rigid system.

FIG. 6 illustrates method 200 comprising step 202 comprising applying tensile load and applying no load under the conditions set forth in step 202. The rightmost portion of FIG. 6 illustrates an implementation in which first side 108 is under tensile stress and in which second side 110 is under compressive stress. In such implementations, tensile load can be applied to tendon 112 to minimize flexure or deformation of elongated structure 102. Other implementations of the method described herein may comprise or include only first side 108 being under tensile stress without second side 110 being under compressive stress prior to application of tensile load to tendon 112. Alternatively, some implementations of the method described herein comprise or include only second side 110 being under compressive stress without first side 108 being under tensile stress prior to application of tensile load to tendon 112. The centermost portion of FIG. 6 illustrates an implementation in which no load is applied to tendon 112.

Referring generally to, e.g., FIGS. 2, 3A, 3B and 5, and particularly to FIG. 6 (block 204), method 200 further comprises measuring strain in at least one of first side 108 of elongated structure 102 or second side 110 of elongated structure 102 to obtain at least one strain measurement. The preceding subject matter of this paragraph characterizes example 46 of the present disclosure, wherein example 46 includes the subject matter of example 45, above.

Measuring strain can provide an operator and/or automated system with information necessary to carry out flexural control for elongated structure 102.

FIG. 6 illustrates measuring strain in at least one of first side 108 of elongated structure 102 or second side 110 of elongated structure 102 to obtain at least one strain measurement as step 204 of method 200.

Referring generally to FIGS. 2, 3A, 3B, and 5 and particularly to, e.g., FIG. 6 (block 210), the tensile load is applied to tendon 112 responsive to measuring the strain. The preceding subject matter of this paragraph characterizes example 47 of the present disclosure, wherein example 47 includes the subject matter of example 46, above.

Measuring strain in at least one of first side 208 of elongated structure 102 or second side 110 of elongated structure in order to obtain at least one strain measurement can enable flexural control of elongated structure 102 reactive or responsive to deformation in order to remove energy from the system, thereby preventing oscillation. Additionally or alternatively, measuring strain can permit real-time response to flexure or deformation.

Referring generally to FIGS. 2, 3A, 3B and 5 and particularly to, e.g., FIG. 6 (block 212), tensile load is proportional to a magnitude of the at least one strain measurement. The preceding subject matter of this paragraph characterizes example 48 of the present disclosure, wherein example 48 includes the subject matter of example 47, above.

Proportional application of tensile load can ensure that tensile load applied reactive to flexure or deformation of elongated structure 102 does not result in unwanted flexure or deformation in a direction opposite initial flexure, Additionally, in some implementations, proportional application of tensile load is not an equal and opposite load to counteract all of the tensile strain within one side of elongated structure 102, but may be sufficient load to minimize risk of harmonic resonant oscillation or vibration resulting in deformation of increasing intensity.

Referring generally to FIGS. 2, 3A, 3B, and 5 and particularly to, e.g., FIG. 6 (block 206), method 200 further comprises applying a compressive load to tendon 112 when at least one of first side 108 of elongated structure 102 is under a second compressive stress or when second side 110 of elongated structure 102 is under a second tensile stress. The preceding subject matter of this paragraph characterizes example 49 of the present disclosure, wherein example 49 includes the subject matter of example 45, above.

Application of a compressive load to tendon 112 provides an additional dimension of force application to one or both of first side 108 of elongated structure 102 and/or second side 110 of elongated structure 102 in order to provide a greater degree of flexural control and/or characteristics of rigidity as may be necessary for a particular application.

FIG. 6 illustrates applying a compressive load to tendon 112 when at least one of first side 108 of elongated structure 102 is under a second compressive stress or second side 110 of elongated structure 102 is under a second tensile stress at step 206 of method 200.

Referring generally to FIGS. 3A and 3B and particularly to, e.g., FIG. 6 (block 208), method 200 further comprises measuring strain in at least one of first side 108 of elongated structure 102 or second side 110 of elongated structure 102 to obtain at least one strain measurement. The preceding subject matter of this paragraph characterizes example 50 of the present disclosure, wherein example 50 includes the subject matter example 49, above.

Measuring strain can provide an operator and/or automated system with information necessary to carry out flexural control for elongated structure 102.

FIG. 6 illustrates measuring strain in at least one of first side 108 of elongated structure 102 or second side 110 of elongated structure 102 to obtain at least one strain measurement as step 208 of method 200.

Referring generally to FIGS. 3A, 3B, and 5 and particularly to, e.g., FIG. 6 (block 214), the tensile load or the compressive load are applied to tendon 112 responsive to measuring the strain. The preceding subject matter of this paragraph characterizes example 51 of the present disclosure, wherein example 51 includes the subject matter example 50, above.

Measuring strain in at least one of first side 208 of elongated structure 102 or second side 110 of elongated structure in order to obtain at least one strain measurement can enable flexural control of elongated structure 102 reactive to deformation in order to remove energy from the system, thereby preventing oscillation. Additionally or alternatively, measuring strain can permit real-time response to flexure or deformation.

Referring generally to FIG. 6 (block 216), the tensile load is proportional to a magnitude of the at least one strain measurement. The preceding subject matter of this paragraph characterizes example 52 of the present disclosure, wherein example 52 includes the subject matter of example 51, above.

Proportional application of tensile load can ensure that tensile load applied reactive to flexure or deformation of elongated structure 102 does not result in unwanted flexure or deformation in a direction opposite initial flexure. Additionally, in some implementations, proportional application of tensile load is not an equal and opposite load to counteract all of the tensile strain within one side of elongated structure 102, but may be sufficient load to minimize risk of harmonic resonant oscillation or vibration resulting in deformation of increasing intensity.

Referring generally to FIG. 6 (block 218), the compressive load is proportional to a magnitude of the at least one strain measurement. The preceding subject matter of this paragraph characterizes example 53 of the present disclosure, wherein example 53 includes the subject matter of example 51, above.

Proportional application of compressive load can ensure that compressive load applied reactive to flexure or deformation of elongated structure 102 does not result in unwanted flexure or deformation in a direction opposite initial flexure. Additionally, in some implementations, proportional application of compressive load is not an equal and opposite load to counteract all of the compressive strain within one side of elongated structure 102, but may be sufficient load to minimize risk of harmonic resonant oscillation or vibration resulting in deformation of increasing intensity.

Examples of the present disclosure may be described in the context of aircraft manufacturing and service method 1100 as shown in FIG. 7 and aircraft 1102 as shown in FIG. 8. During pre-production, illustrative method 1100 may include specification and design block 1104 of aircraft 1102 and material procurement block 1106. During production, component and subassembly manufacturing block 1108 and system integration block 1110 of aircraft 1102 may take place. Thereafter, aircraft 1102 may go through certification and delivery block 1112 to be placed in service block 1114. While in service, aircraft 1102 may be scheduled for routine maintenance and service block 1116. Routine maintenance and service may include modification, reconfiguration, refurbishment, etc. of one or more systems of aircraft 1102.

Each of the processes of illustrative method 1100 may be performed or carried out by a system integrator, a third party, and/or an operator, e.g., a customer. For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 8, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatuses and methods shown or described herein may be employed during any one or more of the stages of the manufacturing and service method 1100. For example, components or subassemblies corresponding to component and subassembly manufacturing block 1108 may be fabricated or manufactured in a manner similar to components or subassemblies produced while aircraft 1102 is in service block 1114. Also, one or more examples of the apparatuses, methods, or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service block 1114 and/or during maintenance and service block 1116.

Different examples of the apparatuses and methods disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A flexurally controlled system comprising:
    a base;
    an elongated structure comprising a first end, a second end opposite the first end, a first side, a second side opposite the first side, and a central axis extending between the first end and the second end, wherein the second end of the elongated structure is connected to the base and the elongated structure is movable relative to the base;
    a tendon having a tendon central axis along a length of the tendon and comprising a third end and a fourth end opposite the third end, wherein the third end of the tendon is attached to the elongated structure at a first region of the elongated structure, wherein the tendon central axis is non-coaxial with the central axis of the elongated structure, wherein the tendon central axis is aligned with a second region of the elongated structure, and wherein the second region is spaced from the first region;
    a first sensor, configured to provide one or more first strain measurements, corresponding to at least one first parameter of the first side of the elongated structure;
    a second sensor, configured to provide one or more second strain measurements, corresponding to at least one second parameter of the second side of the elongated structure;
    a controller, operatively coupled with the first sensor and with the second sensor, and configured to:
        generate a first output responsive to the one or more first strain measurements, received from the first sensor, and
        generate a second output responsive to the one or more second strain measurements, received from the second sensor; and
    an actuator, directly connected to the base and to the fourth end of the tendon and operatively coupled with the controller, and
    wherein:
        the controller is programmed to control the actuator to apply, responsive to at least one of the first output of the controller or the second output of the controller, a load to the tendon such that harmonic resonant oscillation of the elongated structure is prevented by dynamically counteracting flexure of the elongated structure.

2. The flexurally controlled system of claim 1, wherein the load is a compressive load and wherein the actuator is configured to apply the compressive load to the tendon when at least one of the first side of the elongated structure is under a second compressive stress or the second side of the elongated structure is under a second tensile stress.

3. The flexurally controlled system of claim 1, wherein:
    the first region of the elongated structure is proximate the first end of the elongated structure; and
    the second region of the elongated structure is proximate the second end of the elongated structure.

4. The flexurally controlled system of claim 1, wherein the actuator is attached to the elongated structure at the second region of the elongated structure.

5. The flexurally controlled system of claim 1, further comprising a sleeve at least partially enclosing the tendon.

6. The flexurally controlled system of claim 5, wherein the sleeve is internal to the elongated structure.

7. The flexurally controlled system of claim 5, wherein the sleeve is external to the elongated structure.

8. The flexurally controlled system of claim 5, wherein the sleeve completely encloses the tendon.

9. The flexurally controlled system of claim 1, wherein at least a portion of the tendon is internal to the elongated structure.

10. The flexurally controlled system of claim 9, wherein at least the portion of the tendon internal to the elongated structure is at least partially surrounded by a liner configured to reduce friction between the tendon and the elongated structure.

11. The flexurally controlled system of claim 1, wherein the tendon is external to the elongated structure.

12. The flexurally controlled system of claim 1, wherein the tendon comprises reinforcement fibers.

13. The flexurally controlled system of claim 1, wherein the tendon comprises reinforcement fibers and a matrix material impregnated into the reinforcement fibers.

14. An apparatus for flexurally controlling an elongated structure, the apparatus comprising:
    a base;
    an elongated structure, wherein the elongated structure is movable relative to the base;
    a tendon having a tendon central axis and comprising a third end and a fourth end opposite the third end, wherein the third end of the tendon is configured to be attached to the elongated structure at a first region of the elongated structure;
    a sensor, configured to provide strain measurements corresponding to a parameter of the elongated structure;
    a controller, configured to generate an output signal responsive to the strain measurements received from the sensor; and
    an actuator, operatively coupled to the controller, and wherein:
        the controller is programmed to control the actuator to apply a load to the tendon to dynamically counteract flexure of the elongated structure such that harmonic resonant oscillation of the elongated structure is prevented by dynamically counteracting flexure of the elongated structure;
        the fourth end of the tendon is attached to the actuator;
        the tendon is non-coaxial with a central axis of the elongated structure; and
        the tendon central axis is aligned with a second region of the elongated structure.

15. A method of flexurally controlling an elongated structure, the method comprising:
    sensing one or more strain measurements describing at least one parameter of the elongated structure; and
    applying a load to a tendon, based on the one or more strain measurements, to prevent harmonic resonant oscillation of the elongated structure by dynamically counteracting flexure of the elongated structure, and wherein the tendon has a tendon central axis that is non-coaxial with a central axis of the elongated structure, the tendon is coupled to the elongated structure at a first region of the elongated structure, and the tendon central axis is aligned with a second region of the elongated structure.

16. The flexurally controlled system of claim 1, wherein the load is a tensile load and wherein the actuator is configured to apply the tensile load to the tendon when at least one of the first side of the elongated structure is under a first tensile stress or the second side of the elongated structure is under a first compressive stress.

17. The apparatus of claim 14, wherein the load is a tensile load and wherein the actuator is configured to apply the tensile load to the tendon when at least one of a first side of the elongated structure is under a first tensile stress or a second side of the elongated structure is under a first compressive stress.

18. The apparatus of claim 14, wherein the load is a compressive load and wherein the actuator is configured to apply the compressive load to the tendon when at least one of a first side of the elongated structure is under a second compressive stress or a second side of the elongated structure is under a second tensile stress.

19. The flexurally controlled system of claim 1, wherein the at least one first parameter of the first side comprises at least one property, status, or aspect of the first side.

20. The flexurally controlled system of claim 1, wherein the at least one second parameter of the second side comprises at least one property, status, or aspect of the second side.

* * * * *